R. VAUGHAN.
COOKING UTENSIL.
APPLICATION FILED FEB. 7, 1908.
903,803.
Patented Nov. 10, 1908.
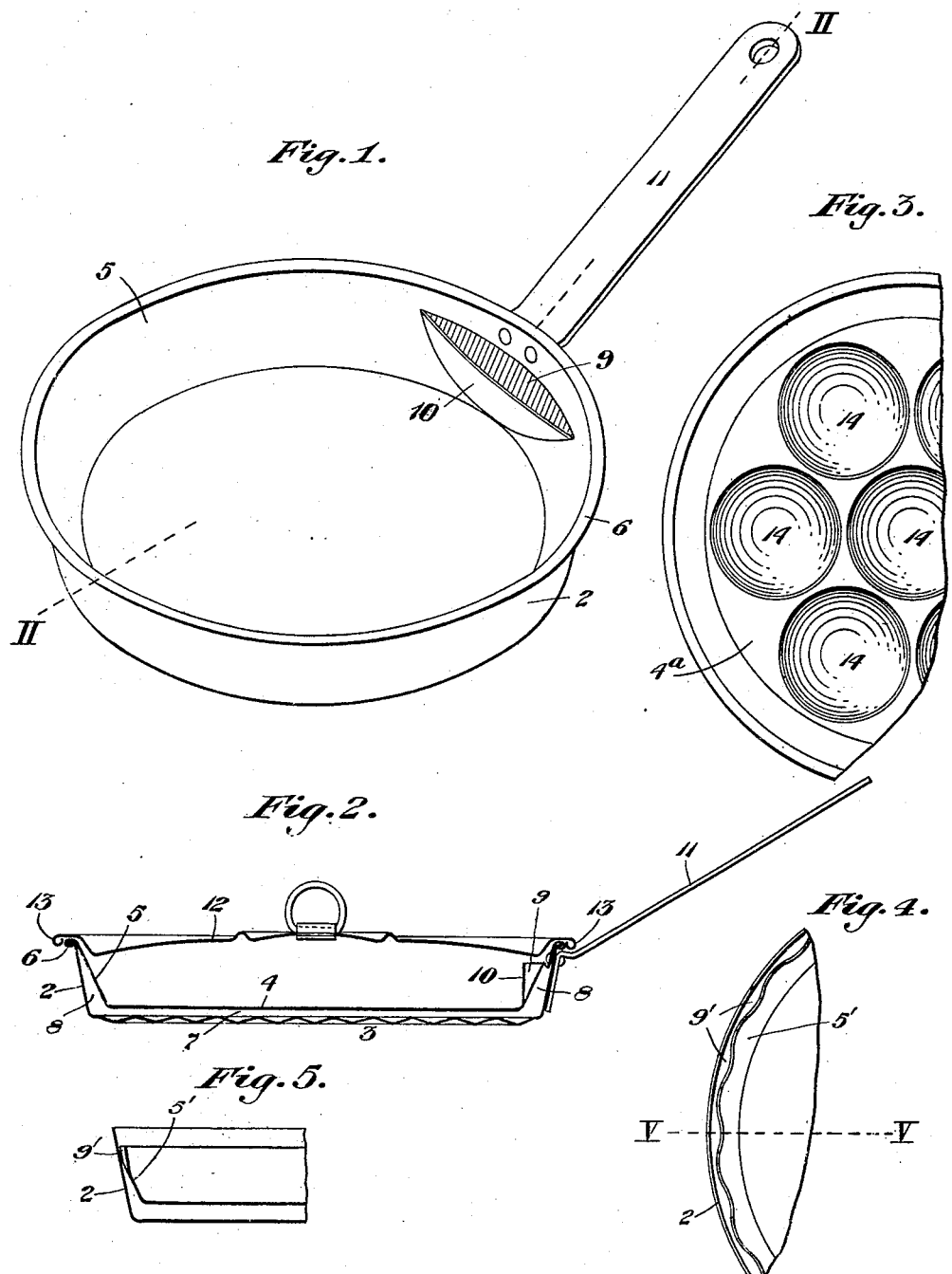

UNITED STATES PATENT OFFICE.

ROSS VAUGHAN, OF PITTSBURG, PENNSYLVANIA.

COOKING UTENSIL.

No. 903,803.  Specification of Letters Patent.  Patented Nov. 10, 1908.

Application filed February 7, 1908. Serial No. 414,708.

*To all whom it may concern:*

Be it known that I, Ross VAUGHAN, a citizen of the United States, residing at Pittsburg, in the county of Allegheny and State of Pennsylvania, have invented certain new and useful Improvements in Cooking Utensils, of which the following is a specification, reference being had therein to the accompanying drawing.

My invention refers to the class of cooking utensils and is particularly designed for the purpose of cooking eggs.

The objects of the invention are to provide means for thoroughly cooking the eggs without an undue application of the heat to any particular part, as for instance the under side, or any undue burning without thorough cooking of the other portions.

Ordinarily eggs which are cooked upon the bottom of an ordinary frying pan or other similar utensil in direct contact with the stove or fire are immediately subjected to the heat of the pan and cook or burn on their under sides before the upper portion of the egg is affected by the heat or sufficiently cooked, resulting in a burned egg or necessitating the turning of it for thorough cooking, and in any case resulting in burning the edges or under side.

In carrying out my invention I not only protect the eggs from contact with the highly heated bottom of the utensil, but utilize the cooking effect of steam which is generated in a space between the main bottom of the pan and an upper or false bottom, means being provided therein for introducing into such space a limited amount of water and for return upwardly therefrom to the cooking chamber or cavity, of the superheated steam, the device being also provided with a tightly fitting cover.

Referring to the drawings illustrating the invention:—Figure 1 is a perspective view of the complete utensil, the cover having been removed. Fig. 2 is a transverse sectional view thereof indicated by the line II. II. of Fig. 1. Fig. 3 is a partial plan view of the inner bottom, showing a modified construction providing recessed cavities for each egg. Fig. 4 is a similar view showing a further modified construction as to the arrangement of the inner pan with relation to the outer pan. Fig. 5 is a sectional detail view indicated by the line V. V. of Fig. 4.

The utensil comprises generally an outer pan 2 of usual construction, but preferably having its bottom portion annularly or otherwise corrugated as indicated at 3, to prevent warping.

4 is the inner pan or secondary bottom set within the outer pan 2 a short distance above its bottom, having its side portions 5 tightly connected with the rim of side 2 in any suitable manner as indicated at 6, whereby the two portions are thus rigidly incorporated together. As thus constructed, I provide an intervening space 7 between the bottoms of the two pans, which space also extends upwardly as indicated at 8 annularly between the outer and inner sides 2 and 5, into which opens a water and steam circulation aperture 9. In the principal construction as illustrated, I provide a single aperture by merely slitting the metal of the inner side 5 at any desired point and bending the lower portion inwardly to provide a lip 10 and a suitable opening of sufficient length and width to pour a small quantity of water into the space 7, a spoonful ordinarily being sufficient for the purpose.

The main pan is provided with a handle 11 and a cover 12 which preferably fits tightly over the connected edges of both pans, or over the outer pan, as clearly indicated in Fig. 2, the covering being preferably provided with an annular bead or lip 13 adapted to tightly embrace said edge.

In Figs. 4 and 5 the sides 5' of the inner pan may be corrugated as indicated in Fig. 4 or cut out upon the upper portion of the side at intervals or constructed in any other suitable manner, so as to provide apertures 9' communicating with the interior space. In such construction, the inner pan is set somewhat below the upper edge of the outer pan 2, the construction and arrangement otherwise being as I have already described.

If desired, the bottom $4^a$ of the inner pan may be provided with a series of depressed cavities 14 as indicated in Fig. 3 adapted to each receive an egg, thereby giving it a circular shape, separating each egg from the others, and preventing adhesion or running together.

In use, the pan having been set upon the stove or heater, the eggs are deposited upon the inner bottom 4, after which a small quantity of water is poured into the interior space 7, which is immediately converted into steam, the covering 12 having been also placed in position. The steam or vapor passes upwardly through the opening 9 or openings 9' into the closed interior containing the eggs, and thoroughly cooks them through from one side to the other in a very short time, say one minute. The bottoms of the eggs are protected from burning, due to the intervening space 7, avoiding the blackened edges or bottoms, while equal access of heat on all sides results in a thoroughly cooked egg of increased palatability and digestibility and within a shorter time than is ordinarily required.

I am aware that utensils have been patented employing heated water for the purpose of maintaining food in a heated condition, or for the purpose of cooking, but believe I am the first to provide a cooking utensil constructed and operable in the manner described, adapted to quickly convert a limited amount of water into steam or vapor, and to distribute it to an upper cooking chamber upon the inner side of the utensil. The particular advantage of such construction is that the vapor is caused to pass upwardly through the lateral aperture and to act upon the upper portion of the contents while undue exposure to the direct heat of the bottom is prevented. This is due to the space intervening between the bottoms of both pans whereby the bottom of the upper pan is prevented from coming into contact with the highly heated stove and is separated from the bottom of the lower pan by the air or steam-containing cavity.

My invention has given excellent results in practice, accomplishing rapid thorough cooking of the eggs, while an incidental feature of advantage is that the cooked eggs may be discharged outwardly from the utensil after being cooked, without adhering to the bottom, as is usually the case where eggs are "fried" in the ordinary way.

It will be understood that the construction and arrangement, proportions, or other details of the device may be changed or varied by the skilled mechanic, but all such changes are to be considered as within the scope of the following claims.

What I claim is:

1. A cooking utensil consisting of an outer pan, an inner pan having its top portion secured to the upper portion of the outer pan and extending downwardly within the outer pan with a narrow space between the bottoms and sides of said pans, said inner pan being provided with a circulating opening from said space to the interior of the inner pan and an inwardly extending pouring lip, substantially as set forth.

2. A cooking utensil consisting of an outer pan, an inner pan having its rim secured to the rim of the outer pan to provide a continuous fluid-tight joint and projecting down within the outer pan with a narrow space intervening between the bottom and sides, said inner pan having an opening through its side and an inwardly extending pouring lip, substantially as set forth.

3. A cooking utensil consisting of an outer pan having upwardly extending sides, an inner pan-shaped body portion having similarly arranged sides set within the outer pan with an intervening space and having its rim tightly secured to the rim of the outer pan, the inner pan being provided with an opening through its side formed by separating the metal and bending it inwardly to provide a pouring projection, substantially as set forth.

4. A cooking utensil consisting of an outer pan having upwardly extending sides, an inner pan-shaped body portion having similarly arranged sides set within the outer pan with an intervening space and having its rim tightly secured to the rim of the outer pan, the inner pan being provided with an opening through its side formed by separating the metal and bending it inwardly to provide a pouring projection, said outer pan having a corrugated bottom, substantially as set forth.

5. A cooking utensil consisting of an outer pan having upwardly extending sides, and an inner pan having similarly arranged sides set within the outer pan with an intervening space and having its rim tightly secured to the rim of the outer pan, the inner being provided with an opening through its side formed by separating the metal and bending it inwardly to provide a pouring projection, and a covering having an outer embracing flange adapted to make a tight interfitting engagement with the upper rim of the device, substantially as set forth.

6. A cooking utensil consisting of an outer pan having upwardly extending sides, an inner pan having similarly arranged sides set within the outer pan with an intervening space and having its rim tightly secured to the rim of the outer pan, the inner pan being provided with an opening through its side formed by separating the metal and bending it inwardly to provide a pouring projection, and having its bottom provided with a plurality of shallow concave recesses, substantially as set forth.

7. In a cooking utensil, the combination of an outer pan having upwardly extending sides, an inner pan having similarly arranged sides sloping inwardly toward its bottom set within the outer pan with an intervening narrow space and having its rim tightly secured to the rim of the outer pan, the bottoms of said pans being closely adjacent to each other, the side of the inner pan being provided with an opening formed by separating the metal and bending it inwardly to provide a pouring projection, substantially as set forth.

In testimony whereof I affix my signature in presence of two witnesses.

ROSS VAUGHAN.

Witnesses:
C. M. CLARKE,
CHAS. S. LEPLEY.